US010927283B2

(12) United States Patent
Bao et al.

(10) Patent No.: US 10,927,283 B2
(45) Date of Patent: *Feb. 23, 2021

(54) FRICTION-REDUCING COMPOSITIONS FOR USE IN DRILLING OPERATIONS

(71) Applicant: ExxonMobil Chemical Patents Inc., Baytown, TX (US)

(72) Inventors: Xiaoying Bao, Houston, TX (US); Catherine A. Faler, Houston, TX (US); Larry L. Iaccino, Seabrook, TX (US); Kyle G. Lewis, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/828,901

(22) Filed: Dec. 1, 2017

(65) Prior Publication Data
US 2018/0179432 A1 Jun. 28, 2018

Related U.S. Application Data

(60) Provisional application No. 62/439,653, filed on Dec. 28, 2016.

(51) Int. Cl.
C09K 8/34 (2006.01)
C09K 8/36 (2006.01)
E21B 21/00 (2006.01)
C09K 8/32 (2006.01)
E21B 33/06 (2006.01)
E21B 33/14 (2006.01)

(52) U.S. Cl.
CPC ............ C09K 8/34 (2013.01); C09K 8/32 (2013.01); C09K 8/36 (2013.01); E21B 21/00 (2013.01); C09K 2208/28 (2013.01); C09K 2208/34 (2013.01); E21B 33/06 (2013.01); E21B 33/14 (2013.01)

(58) Field of Classification Search
CPC combination set(s) only.
See application file for complete search history.

(56) References Cited

U.S. PATENT DOCUMENTS

| 3,649,538 | A | 3/1972 | Hotten |
| 4,406,803 | A | 9/1983 | Liston et al. |
| 4,781,848 | A | 11/1988 | Biresaw et al. |
| 5,559,085 | A | 9/1996 | Duncan, Jr. |
| 5,593,953 | A | 1/1997 | Malchow, Jr. |
| 2004/0014609 | A1 | 1/2004 | Dalmazzone et al. |
| 2005/0037930 | A1 | 2/2005 | Horton |
| 2007/0287640 | A1 | 12/2007 | Ballard |
| 2007/0287767 | A1 | 12/2007 | Ballard |
| 2007/0298976 | A1* | 12/2007 | Ballard .................. C09K 8/32 507/129 |
| 2008/0312399 | A1 | 12/2008 | Dai et al. |
| 2011/0195938 | A1 | 8/2011 | Wunch et al. |
| 2012/0202723 | A1 | 8/2012 | Abbey et al. |
| 2012/0202726 | A1 | 8/2012 | Barton et al. |
| 2013/0098273 | A1 | 4/2013 | Tarafdar et al. |
| 2014/0187457 | A1 | 7/2014 | Kanga et al. |
| 2014/0360451 | A1 | 12/2014 | Dodd |
| 2014/0364345 | A1 | 12/2014 | Sundaram et al. |
| 2014/0371120 | A1 | 12/2014 | Marsh et al. |
| 2015/0065398 | A1 | 3/2015 | Gartland et al. |
| 2015/0087567 | A1 | 3/2015 | Ushioda |
| 2016/0024369 | A1 | 1/2016 | Mirzaei et al. |
| 2017/0002250 | A1 | 1/2017 | Ng et al. |
| 2017/0002251 | A1 | 1/2017 | Haque et al. |
| 2017/0002252 | A1 | 1/2017 | Ng et al. |
| 2017/0002253 | A1 | 1/2017 | Hague et al. |
| 2017/0002254 | A1 | 1/2017 | Haque et al. |
| 2017/0107417 | A1 | 4/2017 | Iaccino et al. |

FOREIGN PATENT DOCUMENTS

| EP | 2447346 A | 5/2012 |
| GB | 629 139 A | 9/1949 |
| GB | 2 251 447 A | 7/1992 |
| JP | 2007 153946 A | 6/2007 |
| WO | 97/10313 A | 3/1997 |
| WO | 2007143749 A | 12/2007 |
| WO | 2008/137706 A | 11/2008 |
| WO | 2010/115864 A | 10/2010 |
| WO | 2015/016874 A | 2/2015 |
| WO | 2017/176244 A | 10/2017 |
| WO | WO-2017176244 A1 * | 10/2017 ............... C09K 8/36 |

OTHER PUBLICATIONS

Hareland et al. Finite Element Analysis of Drillstring and Its Application on Torque and Drag Calculation, The International Journal of Engineering and Science (IJES), 2013, 2, 9-16 (Year: 2013).*
Suresh et al., "Sythesis, Structure, and Properties of Novel Polyols from Cardanol and Developed Polyurethanes," Ind. Eng. Chem. Res. 2005, vol. 44, pp. 4504-4512.
Ionescu et al., "Polyols and Rigid Polyurethane Foams from Cashew Nut Shell Liquid," J. Polym. Environ., 2012, vol. 20, pp. 647-658.
Vorin et al, "Functionalization of Cardanol: Towards Biobased Polymers and Additives," Polym. Chem., 2014, vol. 5, pp. 3142-3162.
Gupta et al., "Preparation and Characterization of electrically conducting Langmuir-Blodgett Films of poly(N-octadecylaniline)," J. Coll. Int. Sci., 2005, vol. 285, pp. 67-73.

(Continued)

Primary Examiner — Ellen M McAvoy
Assistant Examiner — Chantel L Graham

(57) ABSTRACT

Friction-reducing compositions useful for reducing Operating Torque in a drilling operation are described. Methods of conducting drilling operations using such friction-reducing compositions and lubricant compositions formed from blends of the friction-reducing composition with an oil-based mud composition are also described.

21 Claims, 1 Drawing Sheet

(56) References Cited

OTHER PUBLICATIONS

Ito et al., "n-Alkyl Group-Substituted Poly(m-aniline)s: Synthesis and Magnetic Properties," Macromolecules, 1995, vol. 28, No. 16, pp. 5618-5626.
Integrity Industries, Inc. "Ultra Lib II", Apr. 21, 2016, pp. 1-1.
U.S. Appl. No. 62/439,660, filed Dec. 28, 2016, entitled "Friction-Reducing Compositions for Use in Drilling Operations".

* cited by examiner

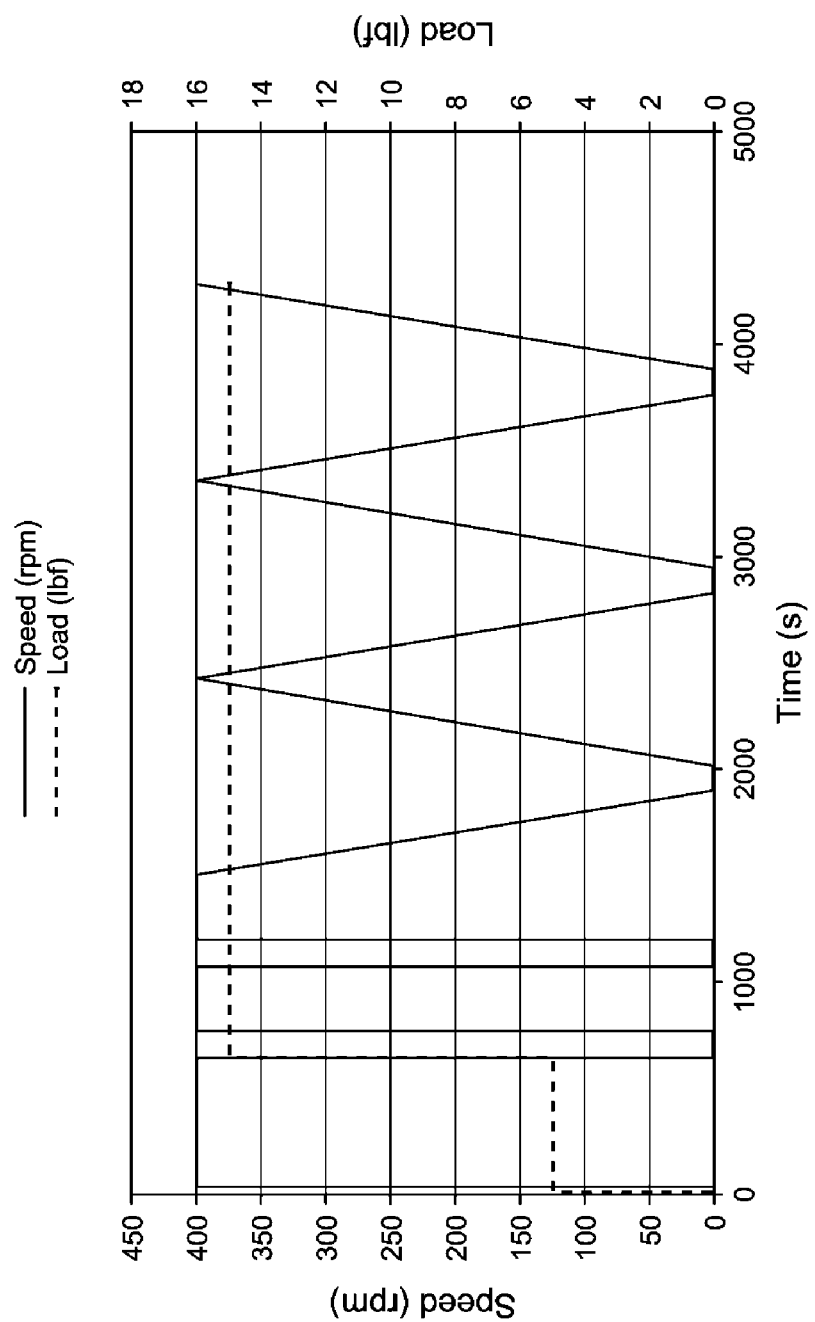

FRICTION-REDUCING COMPOSITIONS FOR USE IN DRILLING OPERATIONS

PRIORITY CLAIM

This application claims priority to and benefit of U.S. Ser. No. 62/439,653, filed Dec. 28, 2016 which is incorporated herein by reference in its entirety.

CROSS-REFERENCE TO RELATED APPLICATIONS

This invention relates to US 2017-0002251 entitled "Glycerol Carbamate Based Lubricant Compositions And Methods Of Making And Using Same;" US 2017-0002254 entitled "Lubricant Compositions and Methods of Making and Using Same;" US 2017-0002252 entitled "Lubricant Compositions and Methods of Making and Using Same;" US 2017-0002253 entitled "Lubricant Compositions Containing Phosphates and/or Phosphites and Methods of Making and Using Same;" US 2017-0002250 entitled "Lubricant Compositions Comprising Diol Functional Groups and Methods of Making and Using Same;" the concurrently filed U.S. Ser. No. 62/439,660 entitled "Friction-Reducing Compositions for Use in Drilling Operations," and the concurrently filed CIP US 2017-0107417 entitled "Lubricant Compositions and Methods of Making and Using Same."

FIELD OF THE INVENTION

The present disclosure relates to friction-reducing compositions useful in drilling operations.

BACKGROUND OF THE INVENTION

The process of drilling operations for the extraction of a natural resource requires a fluid for removing the cuttings from the wellbore, lubricating and cooling the drill bit, controlling formation pressures, and maintaining hole stability. Many formations present difficulties for drilling operations. For example, the horizontal displacement that occurs in extended reach drilling (ERD) is often limited by torque and drag losses due to friction. Surface interactions, such as rotation of the drill string, is believed to contribute to such frictional losses. In extended reach drilling, frictional losses can be reduced by using a hydrocarbon-based drilling fluid, e.g., an oil-based mud composition. Such drilling fluids are typically used for multiple wells and in use for multiple years. During the course of use, components will frequently be added to make-up for losses in volume, degradation of components, and/or to adjust properties. For example, additives can be added to the drilling fluid to further reduce the frictional losses.

Nevertheless, extended reach drilling could be more useful if longer wellbores could be effectively drilled. Thus, there is need in the art for new friction-reducing compositions, e.g., for use in drilling operations, particularly extended reach drilling.

References of interest include Suresh et al., "Synthesis, Structure, and Properties of Novel Polyols from Cardanol and Developed Polyurethanes," Ind. Eng. Chem. Res. 2005, Vol. 44, pp. 4504-4512; Ionescu et al., "Polyols and Rigid Polyurethane Foams from Cashew Nut Shell Liquid," J. Polym. Environ., Vol. 20, pp. 647-658, (2012); and Vorin et al, "Functionalization of Cardanol: Towards Biobased Polymers and Additives," Polym. Chem., Vol. 5, pp. 3142-3162, (2014); Gupta et al., "Preparation and characterization of electrically conducting Langmuir-Blodgett films of poly(N-octadecylaniline)," J. Coll. Int. Sci., Vol. 285, pp. 67, (2005); and Ito et al., "n-Alkyl Group-Substituted Poly(m-aniline)s: Synthesis and Magnetic Properties," Macromolecules, Vol. 28(16), pp. 5618-5626, (1995).

SUMMARY OF THE INVENTION

The subject matter of this application relates, in part, to the discovery that certain compositions, when added to an oil-based mud composition, can significantly reduce the coefficient of friction experienced during drilling operations. It is believed that such reductions in the coefficient of friction can lead to improved drilling, particularly to drill longer wellbores.

Thus, in one aspect, the subject matter of this application relates to methods for conducting drilling operations using an oil-based mud composition. These methods generally comprise operating the drilling operation for a period of time with the oil-based mud composition, followed by adding to the drilling operation a friction-reducing composition comprising one or more compounds represented by Formula I:

$$X_m\text{—Ar—}R_n \qquad \text{Formula I,}$$

wherein Ar is a single or multi-ring aromatic moiety, each X group is a polar functional group, each R group is independently selected from a branched or unbranched, saturated or unsaturated, substituted or unsubstituted $C_1$ to $C_{50}$ hydrocarbyl group, wherein n is an integer greater than or equal to 1, and wherein m is an integer greater than or equal to 0 if at least one R group is substituted with a functional group and/or Ar contains a heteroatom, and otherwise is an integer greater than or equal to 1. Generally, the friction-reducing composition is at least partially dispersible in the oil-based mud composition at bulk conditions of the drilling operation. Preferably, the methods further comprise determining a torque limit of the drilling operation. In such aspects, the friction-reducing composition is generally added when the Operating Torque of the drilling operation is ≥about 90% of the torque limit.

In another aspect, the subject matter of this application relates to a targeted use of the friction-reducing composition to reduce the Operating Torque of a drilling operation. Preferably, the use of the friction-reducing composition reduces the Operating Torque of the drilling operation by at least about 1%, more preferably at least about 5%, and ideally at least about 10%. In still another aspect, the subject matter of this application relates to lubricant compositions comprising the blended product of an oil-based mud composition and the friction-reducing composition.

BRIEF DESCRIPTION OF THE FIGURE

The FIGURE depicts a schematic of the testing protocol used to determine coefficient of friction in Examples 1 to 20.

DETAILED DESCRIPTION OF THE PREFERRED EMBODIMENTS

All numerical values within the detailed description and the claims herein are modified by "about" or "approximately" the indicated value, and take into account experimental error and variations that would be expected by a person having ordinary skill in the art. Unless otherwise indicated, room temperature is about 23° C.

As used herein, the terms "well" and "wellbore" are used interchangeably and can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 10 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing or drill string may be placed into the wellbore. The tubing or drill string allows fluids to be circulated in the wellbore. In a cased-hole wellbore portion, a casing is placed and cemented into the wellbore, which can also contain a tubing or drill string. The space between two cylindrical shapes is called an annulus. Examples of an annulus include, but are not limited to: the space between the wellbore and the outside of a tubing or drill string in an open-hole wellbore; the space between the wellbore and the outside of a casing in a cased-hole wellbore; and the space between the inside of a casing and the outside of a tubing or drill string in a cased-hole wellbore.

For the purpose of this invention and the claims thereto, friction means the mechanical resistance and rubbing of the drill string with the cased hole and the open hole as the drill string or tubing is moved, withdrawn, advanced, or rotated. Furthermore it also comprises the mechanical resistance of coiled tubing inside the cased and the open hole; introducing casing; introducing screens; introducing tools for cleaning, fracturing, and perforating; rotating drill string; advancing the wellbore; withdrawing a drill string; and/or withdrawing coiled tubing. For the purpose of this invention and the claims thereto, drilling operations include the interaction of the drill string with the cased hole and the open hole as the drill string or tubing is moved, withdrawn, advanced, and/or rotated. Furthermore it also comprises the movement of coiled tubing inside the cased and the open hole; introducing casing; introducing screens; introducing tools for cleaning, fracturing, and perforating; rotating drill string; advancing the wellbore; withdrawing a drill string; and/or withdrawing coiled tubing.

For the purposes of this invention and the claims thereto, the new numbering scheme for the Periodic Table Groups is used as described in Chemical and Engineering News, (1985), Vol. 63(5), pg. 27.

The person of ordinary skill in the art will recognize that hydroxyl groups on the compounds described herein are subject to deprotonation. Thus, alcohols and/or phenols described herein, e.g., alkylphenols and polyols, include salts formed by the reaction thereof with a suitable counterion. Some suitable counterions include, but are not limited to, Group 1-2 metals, organic cations, e.g., $NR_4^+$ and $PR_4^+$ groups, where each R group is independently selected from H and hydrocarbyl groups.

In any embodiment described herein, Group 1-2 metals include: Li, Na, K, Rb, Cs, Fr, Be, Mg, Ca, Sr, Ba, Ra, preferably Li, Na, K, Cs, Mg, and Ca.

The terms "hydrocarbyl radical," "hydrocarbyl," and "hydrocarbyl group," are used interchangeably throughout this document. Likewise, the terms "alkyl radical" and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{50}$ radicals, that may be linear, branched, or cyclic, and when cyclic, aromatic or non-aromatic. Substituted hydrocarbyl radicals are radicals in which at least one hydrogen atom of the hydrocarbyl radical has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one carbon atom of the hydrocarbyl radical has been substituted with at least one heteroatom or heteroatom containing functional group. For purposes of this disclosure, "alkyl radical" and interchangeable terms therewith, e.g., "alkyl," are defined to be substituted or unsubstituted aliphatic hydrocarbyl radicals. For the avoidance of doubt, "alkyl radicals" encompass both saturated hydrocarbyl radicals and those having some degree of unsaturation, such as one or more double bonds. Particularly, "alkyl radicals" as used herein may be formed from alkanes, alkenes, and/or alkynes. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Examples of suitable unsaturated radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues. The term "thioalkyl" refers to an alkyl group where at least one carbon atom has been substituted with a sulfur atom.

The term "aromatic" or "aromatic moiety" refers to a stable mono- or polycyclic, unsaturated moiety, preferably having 3-14 carbon atoms, each of which may be substituted or unsubstituted. Generally, the term "aromatic" or "aromatic moiety" refers to one or more rings, each ring having p-orbitals perpendicular to the plane of the ring at each ring atom and satisfying the Hückel rule. The term "aryl" or "aryl group" means a six carbon aromatic ring and the substituted variants thereof, including but not limited to, phenyl, 2-methyl-phenyl, xylyl, etc. Likewise, heteroaryl means an aryl group where a ring carbon atom (or two or three ring carbon atoms) has been replaced with a heteroatom, preferably N, O, or S. As used herein, the term "aromatic" also refers to substituted aromatics. Substituted aromatics refer to an aromatic group having at least one hydrogen replaced with a hydrocarbyl or substituted hydrocarbyl group, or a heteroatom or heteroatom-containing group.

Where isomers of a named alkyl, alkoxide, aromatic, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkoxide, aromatic, or aryl group without specifying a particular isomer (e.g., butyl) expressly discloses all isomers (e.g., n-butyl, iso-butyl, sec-butyl, and tert-butyl).

As used herein, a "primary carbon atom" refers to a carbon atom bonded to one carbon atom, a "secondary carbon atom" refers to a carbon atom bonded to two carbon atoms, a "tertiary carbon atom" refers to a carbon atom bonded to three carbon atoms, and a "quaternary carbon atom" refers to a carbon atom bonded to four carbon atoms.

As used herein, the term "cashew nut shell liquid (CNSL)" refers to a liquid extracted from a cashew nut shell.

As used herein, the term "heterogeneous blend" means a composition having two or more morphological phases in the same state. For example a blend of immiscible components, e.g., oil and water, where one component forms discrete packets dispersed in a matrix of another component is said to be heterogeneous. By continuous phase is meant the matrix phase in a heterogeneous blend. By discontinuous phase is meant the dispersed phase in a heterogeneous blend.

Throughout this disclosure and the claims appended thereto, suitable friction-reducing compositions and/or suitable compounds contained within the friction-reducing compositions may be described as "at least partially dispersible in the oil-based mud composition at bulk conditions of drilling operations." As used herein, this description refers to materials that are at least partially soluble in and/or exist in the liquid state as a heterogeneous blend at the bulk conditions of the drilling operations. These bulk conditions include temperatures in the well ranging from a low of about 50° C., 60° C., 70° C., 80° C., 90° C., 100° C., or 125° C. to a high of about 170° C., and pressures ranging from ambient pressure to a high of about 100 bar (10,000 kPa), 200 bar (20,000 kPa), 300 bar (30,000 kPa), 400 bar (40,000 kPa), 500 bar (50,000 kPa), or 600 bar (60,000 kPa). It is desirable for at least 10% of the friction-reducing composition and/or compounds contained therein to be dispersible, such as at least 20%, 30%, 40%, 50%, 60%, 70%, 80%, 90%, 95%, 99%, or even 100%.

Kinematic viscosity (also referred to as viscosity) is determined by ASTM D445, and is typically measured at 40° C. (Kv40) or 100° C. (Kv100). If temperature is not indicated, the viscosity is Kv100.

Friction-Reducing Composition

Friction-reducing compositions according to the subject matter of the disclosure comprise one or more compounds represented by Formula I:

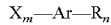  Formula I, wherein Ar is a single or multi-ring aromatic moiety, each X group is a polar functional group, each R group is independently selected from a branched or unbranched, saturated or unsaturated, substituted or unsubstituted $C_1$ to $C_{50}$ hydrocarbyl group, e.g., a $C_5$ to $C_{40}$ hydrocarbyl group, $C_{10}$ to $C_{30}$ hydrocarbyl group, $C_{15}$ to $C_{25}$ hydrocarbyl group, or $C_{15}$ to $C_{20}$ hydrocarbyl group, wherein n is an integer greater than or equal to 1, and wherein m is an integer greater than or equal to 0 if at least one R group is substituted with a polar functional group and/or Ar contains a heteroatom, and otherwise is an integer greater than or equal to 1. Preferably, X is greater than or equal to 1. As one of skill in the art would appreciate, although m and n are each defined as integers, suitable mixtures may be prepared of two or more compounds having differing numbers of X and/or R groups. In such mixtures, the average value of m and n per compound may be a non-integer. Without wishing to be bound by theory, it is believed that the polar functional group(s) contained in the compound according to Formula I aid in adsorption of the compound onto a surface, that the aromatic moieties interact to strengthen the adsorbed film, and that the R group(s) aid in the formation of a lubricant film with nearby adsorbed compounds.

Preferably, Ar is selected from the group consisting of an aryl group, a heteroaryl group, a biphenyl group, deprotonated cyclic $C_5$ diolefins, and a polynuclear aromatic group. Suitable heteroaryl groups include, but are not limited to, pyridine, quinolone, acridine, pyrazine, imidazoline, thiopene, and benzothiopene. Suitable polynuclear aromatic groups include, but are not limited to, naphthalene, anthracene, indane, indene, and tetralin. Often, Ar is a phenyl group or a polynuclear aromatic group. Particularly preferably, Ar is a phenyl group.

Preferably, each X group is individually selected from the group consisting of —OH (hydroxyl group), —OCH$_3$ (methoxy group), —NH$_2$ (amino group), —NO$_2$ (nitro group), —CHO (aldehyde group), —CH$_3$OH (methanol group), —SO$_2$R (sulfonyl group), amines (e.g., polyamines), polyols, oxazolidines, Group 1-2 metals, NR$_4^+$ groups, PR$_4^+$ groups, and a glycosyl group. Particularly preferably, at least one X group is —OH. Preferably, each X group has a polarity at least as strong as that of —OCH$_3$, more preferably a polarity stronger than that of —OCH$_3$. For example, each X group may have a polarity with the range of the polarity of —OCH$_3$ and the polarity of —OH. Often, the compound represented by Formula I is not an ethoxylate. For example, often each X group is not selected from groups of the structure —(OC$_2$H$_4$)$_z$OH, wherein z is an integer of at least one, generally in the range from 1 to 10. Often, if Ar is a naphthalene group, each X is not —OH.

Preferred R groups include ethyl, as well as branched and unbranched isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosanediol, docosyl, tricosyl, tetracosyl, and unsaturated variants of any of the foregoing, particularly wherein the unsaturation is in the form of one or more double bonds. Especially preferred R groups contain a carbon backbone having at least ten carbon atoms, more preferably at least fifteen carbon atoms. Optionally, one or more R groups can also be comprised of mixtures of alkyl groups, cycloalkyl groups, aromatic groups and other related hydrocarbyl groups.

It has been found that the number of carbons atoms adjacent to the α carbon relative to Ar affects the oxidative stability of the R group, with R groups containing a quaternary α carbon relative to Ar being most stable and R groups containing a tertiary α carbon relative to Ar being least stable. Accordingly, branched R groups preferably contain a quaternary α carbon relative to Ar (i.e., a quaternary carbon atom directly bonded to Ar).

Often, at least one R group is substituted. For example, preferably at least one hydrogen atom of the hydrocarbyl radical may be substituted with a polar functional group selected from the group consisting of consisting of —OH, —OCH$_3$, —NH$_2$, —NO$_2$, —CHO, —CH$_3$OH, —SO$_2$R, polyamines, polyols, oxazolidines, Group 1-2 metals, NR$_4^+$ groups, PR$_4^+$ groups, and a glycosyl group, more preferably an —OH group. Preferably, the polar functional group is bonded either to the α or β carbon relative to Ar, more preferably the α carbon. Alternatively or additionally, at least one carbon atom of the hydrocarbyl radical (preferably, the α or β carbon relative to Ar, more preferably the α carbon) may be substituted with at least one heteroatom or heteroatom containing functional group. Preferred heteroatoms include S (sulfur), O (oxygen), N (nitrogen), and P (phosphorus). Preferred heteroatom-containing functional groups include carbonyl and amide.

The combination of Ar and the X group(s) in the compound represented by Formula I may be collectively referred as the "polar head" of the compound, which the R group(s) may each be referred to as an "alkyl tail." Preferably, the cross-sectional area of the polar head is proportional to the cross-sectional area of each alkyl tail. For example, the cross-sectional area of the polar head is preferably no greater than 3 times the cross-sectional area of each alkyl tail, more preferably no greater than 2 times.

Generally, the compound according to Formula I may comprise multiple X groups and/or multiple R groups, e.g., at least one of m or n is greater than or equal to 2. Preferably, m may be 2, 3, or 4. Additionally or alternatively, n may be 2, 3, or 4.

Preferably, the friction-reducing composition comprises at least one compound represented by at least one of the Formulas Ia, Ib, or Ic:

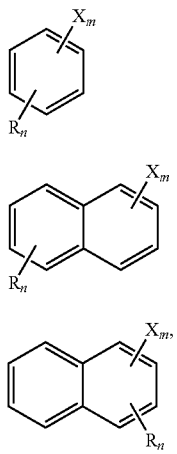

wherein R, X, m, and n are each as they are defined above in relation to Formula I. Particularly preferably, the friction-reducing composition comprises at least one compound represented by Formula Ia. Preferably in compounds according to Formula Ia, one or more R groups are located meta- or para- from an X group, more preferably para-.

Suitable compounds according to Formula Ia, Ib, or Ic may be synthesized from petroleum-based precursors or derived from naturally occurring sources. Preferred compounds according to Formula Ia, Ib, or Ic include alkylphenols, alkyl anisoles, alkyl naphthols, components of cashew nut shell liquid (CNSL), thioalkylphenols, alkyl benzamides, alkyl anilines, and derivatives of any of the foregoing. Alkylphenols and derivatives thereof are especially preferred, particularly those having at least ten carbon atoms in the alkyl chain, i.e., $C_{10}+$ alkylphenols. For example, particular compounds according to Formula Ia include 4-dodecylphenol, 3-pentadecylphenol, and cardanol.

Generally, the compound according to Formula 1 is at least partially dispersible in the oil-based mud composition at bulk conditions of drilling operations. More preferably, the compound according to Formula 1 is in the liquid state at bulk conditions of drilling operations. Furthermore, the compound according to Formula 1 is typically reactively stable at bulk conditions of drilling operations against the formation a material that is not at least partially dispersible in the oil-based mud composition at bulk conditions of drilling operations. For example, at bulk conditions of drilling operations, the compound according to Formula 1 will typically react to form a material that is not at least partially dispersible in the oil-based mud composition at a rate of less than about 10 mol % per day based on the total moles of the compound present in the friction reducing composition, more preferably less than about 5 mol % per day, and ideally less than about 1 mol % per day, such as about 0 mol % per day. Additionally or alternatively, the compound according to Formula 1 generally does not polymerize and/or crosslink under the bulk conditions of drilling operations. For example, at bulk conditions of drilling operations, the compound according to Formula 1 will typically crosslink and/or polymerize at a rate of less than about 10 mol % per day based on the total moles of the compound present in the friction reducing composition, more preferably less than about 5 mol % per day, and ideally less than about 1 mol % per day, such as about 0 mol % per day. Accordingly, the compound according to Formula 1 typically does not comprise a functional group that would facilitate crosslinking, such as via reaction with a crosslinking agent or a gelling agent, or otherwise facilitate reaction of the compound to form a polymeric structure, e.g., a gel. For instance, preferably the compound according to Formula 1 does not comprise an epoxide group. More particularly, typically the X group(s) of the compound according to Formula 1 are not epoxide groups. Additionally, typically the R group(s) of the compound according to Formula 1 are not substituted with an epoxide group. Additionally or alternatively, the friction reducing composition is typically free or substantially free of epoxide functionalized compounds represented by Formula I. More preferably, the friction reducing composition is typically free or substantially free of epoxide functionalized CNSL components, such as epoxide functionalized cardanol. For example, the friction reducing composition typically comprises less than about 0.5 wt % of epoxide functionalized compounds according to Formula 1, such as epoxide functionalized cardanol, based on the weight of the friction reducing composition, more preferably less than about 0.1 wt, such as about 0 wt %.

Particular suitable compounds and/or classes of compounds according to Formulas Ia, Ib, or Ic are described below. The invention is not limited to these compounds, and is not meant to foreclose other compounds within the broader scope of the invention.

CNSL Components

Suitable components of CNSL according to Formula Ia are represented by the following structures:

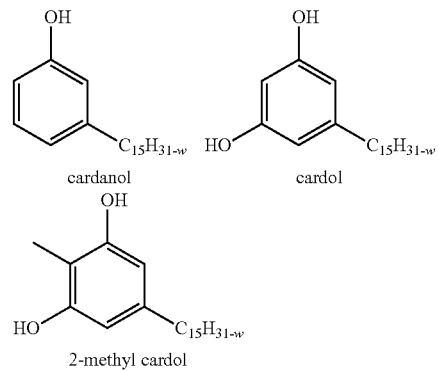

wherein w is 0, 2, 4, or 6.

Generally, each of the CNSL components represented by the structures above comprises a mixture of compounds with respect to the degree of saturation of the alkyl chain. For example, generally each component comprises from about 35 to about 60 wt % of monoene alkyl chains (w=2) based on the total weight of the component, such as from about 45 to about 50 wt %, from about 15 to about 40 wt % triene alkyl chains (w=6) based on the total weight of the component, such as from about 25 to about 30 wt %, from about 10 to about 20 wt % diene alkyl chains (w=4) based on the total weight of the component, such as from about 13 to about 18 wt %, and from about 3 to about 10 wt % saturated alkyl chains (w=0) based on the total weight of the component, such as from about 4 to about 9 wt %. CNSL components may be hydrogenated to increase the degree of saturation; i.e., increase the fraction of molecules with w=0 and decrease the amount of molecules with w>0; preferably the amount of molecules with w=0 may be >about 10%, >about 50%; about >90%; or >about 99%.

Typically, the friction-reducing composition may comprise a mixture of two or more of the CNSL components. Suitable mixtures may comprise commercial grade CNSL. Typical mixtures, e.g., commercial grade CNSL, comprise from about 50 to about 80 wt % cardanol based on the total weight of the mixture, such as from about 60 to about 75 wt %, from 5 to 15 wt % cardol based on the total weight of the mixture, such as from about 10 to about 12 wt %, and from about 0.5 to about 5 wt % 2-methyl cardol based on the total weight of the mixture, such as from about 1 to about 3 wt %. Additionally or alternatively, suitable mixtures may comprise a ratio of cardanol to cardol ranging from about 4:1 to about 15:1, such as about 6:1. Preferred mixtures comprise little to no anacardic acid, e.g., less than about 5 wt %, more preferably less than about 1 wt %, and ideally less than about 0.5 wt % based on the total weight of the mixture. Useful commercial grade CNSL is available from Cardolite Corporation and Palmer International, Inc., such as NC-603 available from Cardolite Corporation. Alternatively, the friction-reducing composition may comprise purified cardanol, cardol, and/or 2-methyl cardol, preferably cardanol, that has been separated from CNSL, e.g., via vacuum distillation or solvent extraction. Often, the purified cardanol is hydrogenated. Examples of suitable commercially available purified cardanol include NX-2023 and NX-2024, both available from Cardolite Corporation, and 1500-1 available from Palmer International, Inc. A suitable hydrogenated cardanol containing product is NC-510, available from Cardolite Corporation.

LAO & PAO Based Compounds

Suitable compounds according to Formula Ia, Ib, or Ic may comprise linear alpha olefin (LAO) or PAO based compounds, particularly functionalized aromatics alkylated with an LAO and/or PAO. For purposes herein, "functionalized aromatic" refers to an aromatic moiety functionalized with one or more polar functional groups. Preferred functionalized aromatics include phenol, anisole, and naphthol (forming alkylphenol, alkyl anisole, or alkyl naphthol upon alkylation, respectively). The alkylation of the functionalized aromatic with the LAO and/or PAO may be performed using known alkylation methods. Often, the alkylation is catalyzed, e.g., using an acid ion-exchange resin or a zeolite. Preferred zeolites are those that selectively alkylate in the para-position. Examples of suitable LAO or PAO based compounds are those represented by the following structures:

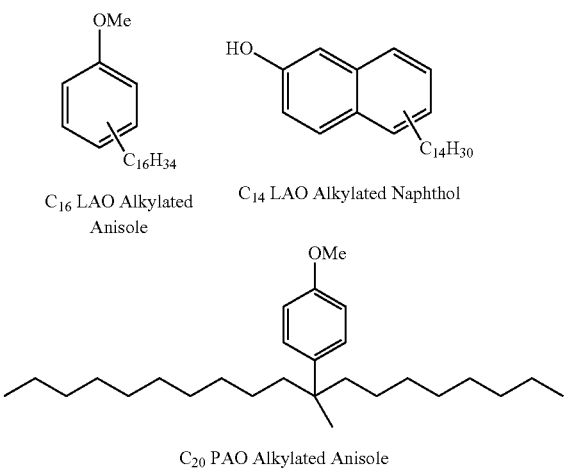

$C_{16}$ LAO Alkylated Anisole $C_{14}$ LAO Alkylated Naphthol $C_{20}$ PAO Alkylated Anisole Particularly preferably, PAOs containing one olefin unsaturation, namely an unhydrogenated PAO, or uPAO, are useful for preparing compounds according to Formulas Ia, Ib, or Ic. The uPAO may be prepared by oligomerizing α-olefins ranging from carbon numbers of $C_3$-$C_{24}$ and any combination therein. The uPAO oligomer may range from an Mn of 84-7000 Daltons, or carbon numbers of $C_6$ to $C_{500}$. The uPAO may consist of dimers, trimers, tetramers, pentamers, etc., of α-olefins. The oligomerization catalyst used to prepare the uPAO may be the same as any oligomerization catalyst that is known for the preparation of PAO synthetic lubricant basestocks. Exemplary examples include metallocene oligomerization catalyst (US 2013/0090277 or U.S. Pat. Nos. 5,688,887 and 6,043,401, each hereby incorporated by reference in their entireties), supported chromium catalyst (U.S. Pat. No. 5,171,915, hereby incorporated by reference in its entirety), or a Lewis acid catalyst, including but not limited to $BF_3$ or $AlCl_3$ catalysts. The unsaturation in the uPAO may have vinylidene, trisubstituted, or vinyl olefin geometry. Alkylation to the functionalized aromatic may generate a new carbon-carbon bond at a tertiary, secondary, or primary carbon of the PAO moiety. Preferably, alkylation occurs at the tertiary carbon, resulting in a compound having a quaternary carbon relative to the aromatic moiety. Such compounds generally benefit from enhanced oxidative stability. The functionalized aromatic alkylated with the PAO may contain 1-5 PAO moieties. The uPAO or the functionalized aromatic alkylated with the PAO may constitute any combination of the variants mentioned herein.

Alkyl Benzamides & Alkyl Anilines

Additional suitable compounds according to Formula Ia may comprise alkyl benzamides and/or alkyl anilines. Often, suitable alkyl benzamides contain a nitro functional group, such as the compounds represented by the following structures:

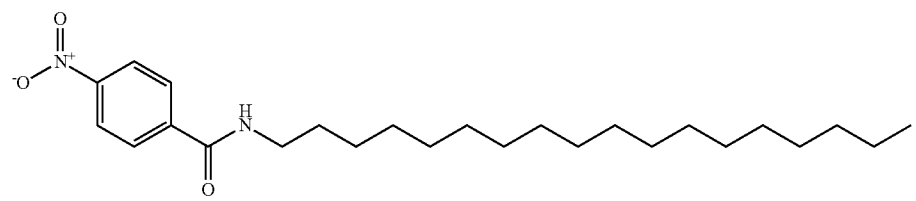

4-nitro-N-octadecylbenzamide

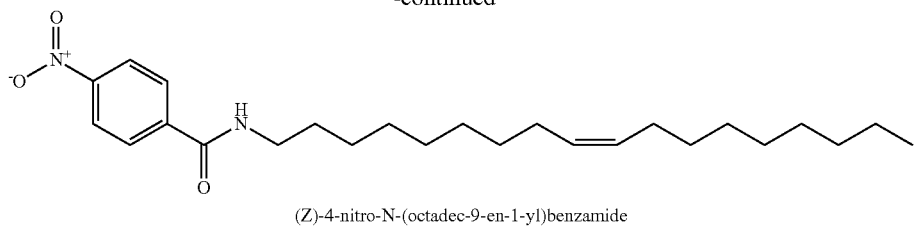

(Z)-4-nitro-N-(octadec-9-en-1-yl)benzamide

Compounds represented by the structures above may be synthesized via the amidation of benzoyl chloride with an alkylamine, e.g., oleylamine.

Particularly suitable alkyl anilines are those represented by the following Formulas Ia(i) and Ia(ii):

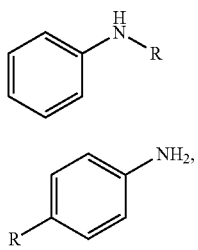

wherein R is as it is defined above in relation to Formula I. Alkyl anilines of the structure illustrated in Formula Ia(i) above may be synthesized in accordance with the procedures described in Gupta et al., "Preparation and characterization of electrically conducting Langmuir-Blodgett films of poly (N-octadecylaniline)," J. Coll. Int. Sci., 285, 67 (2005). A particularly preferred alkyl aniline according to formula Formula Ia(i) is N-octadecylaniline. Alkyl anilines of the structure illustrated in Formula Ia(ii) above may be synthesized by first forming halogen substituted alkyl anilines in accordance with the procedures described in Ito et al., "n-Alkyl Group-Substituted Poly(m-aniline)s: Synthesis and Magnetic Properties," Macromolecules, Vol. 28(16), pp. 5618-5626, (1995), followed by cleavage of the halogen atom in accordance with methods known in the art.

Thioalkylphenols

Additional suitable compounds according to Formula Ia may comprise thioalkylphenols. An example of a suitable thioalkyphenol is BNX™ 1037, commercially available from Mayzo, Inc. and represented by the following structure:

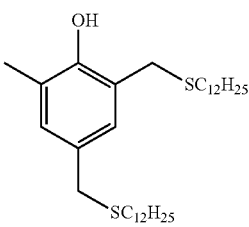

phenol, 2,4-bis[(dodecylthio)methyl]-6-methyl-

Derivative Compounds

Preferred compounds according to Formula Ia may be derivatives of any of the above described compounds, preferably derivatives formed from alkylphenols, more preferably from cardanol. Suitable cardanol derivatives include aminated cardanols, e.g., phenalkamines, polyols and Mannich base precursors thereof, nitrated cardanols, sulfonated cardanols, and glycosyl-modified cardanols. Suitable analogous derivatives may be formed from alkylphenols apart from cardanol.

Suitable aminated cardanols may be synthesized via the Mannich base reaction between cardanol, an aldehyde, e.g., formaldehyde, and an amine. Preferred aminated cardanols are phenalkamines, i.e, compounds wherein the amine used to form the amininated cardanol is a polyamine, e.g., ethylenediamine or diethyltriamine. An example of a suitable commercially available phenalkamine is RAC-951LV available from Palmer International Inc. and having the following structure:

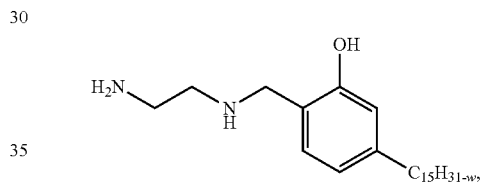

wherein w is 0, 2, 4, or 6.

Additional examples of suitable aminated cardanols are depicted in the structures below:

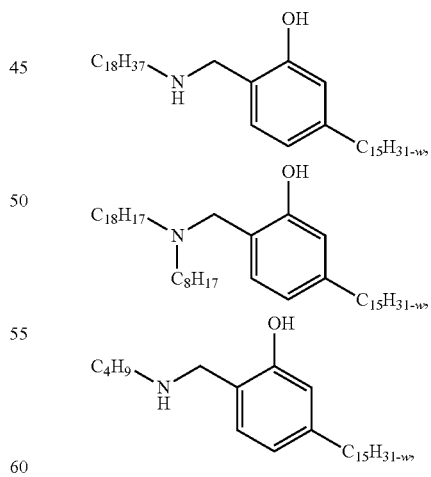

wherein w is 0, 2, 4, or 6.

Generally, suitable polyols comprise at least two hydroxyl groups, such as two, three, or four hydroxyl groups. Suitable polyols may be synthesized in accordance with the procedures described in Suresh et al., "Synthesis, Structure, and Properties of Novel Polyols from Cardanol and Developed Polyurethanes," Ind. Eng. Chem. Res., 2005, 44, pp. 4504-4512, particularly diols represented by the structure:

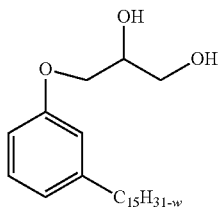

wherein w is 0, 2, 4, or 6.

Alternative methods of producing polyols via Mannich base precursors are described in Ionescu et al., "Polyols and Rigid Polyurethane Foams from Cashew Nut Shell Liquid," J. Polym. Environ. Vol. 20, pp. 647-658, (2012). These methods generally proceed by reacting a cardanol with an oxazolidine, e.g., N-(2-hydroxyethyl)-1,3-oxazolidine to form a Mannich base (itself a suitable cardanol derivative according to Formula Ia), followed by alkoxylation to form the polyol.

Suitable glycolsyl-modified cardanols may be represented by the following structure:

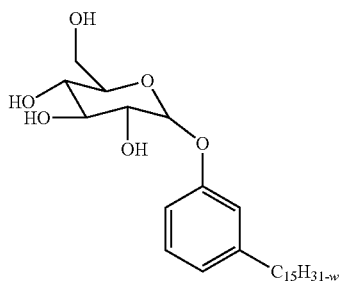

wherein w is 0, 2, 4, or 6. Glycosyl-modified cardanols of the structure illustrated above may be synthesized by reacting cardanol with glucose pentaacetate in the presence of a Lewis acid, e.g., $BF_3$—$OEt_2$.

Secondary Component

The friction-reducing composition may, optionally, include one or more secondary friction-reducing components. Secondary friction-reducing components may be selected from nitrogen-containing compounds; esters; substituted imidazolines and amides (described in US 2017-0002252 entitled "Lubricant Compositions and Methods of Making and Using Same;" hydrocarbyl diols, particularly wherein the hydrocarbyl group is selected from $C_{10}$ to $C_{25}$ alkyl groups e.g., octadecane-1-2-diol (described in US 2017-0002254 entitled "Lubricant Compositions and Methods of Making and Using Same"); glycerol carbamates; e.g., oleyl glycerol carbamate (described in US 2017-0002251 entitled "Glycerol Carbamate Based Lubricant Compositions and Methods of Making and Using Same"); hydrocarbyl thioglycerols, e.g., octadecyl thioglycerol; and hydrocarbyl-substituted glycerols, e.g., glycerol monostearate (described in US 2017-0002250 entitled "Lubricant Compositions Comprising Diol Functional Groups and Methods of Making and Using Same") phosphate esters and dihydrocarbyl hydrogen phosphites, e.g., tri-oleyloxy phosphate; and polyethyleneglycol-containing hydrocarbyl ether phosphate esters (described in US 2017-0002253 entitled "Lubricant Compositions Containing Phosphates and/or Phosphites and Methods of Making and Using Same"); and oligomers/polymers formed from compounds of the type described herein e.g., phenoliz resins (, U.S. Ser. No. 62/439,660, entitled "Friction-Reducing Compositions for Use in Drilling Operations"), each of which is incorporated by reference in its entirety as a part of this disclosure.

Useful secondary friction-reducing components include, e.g., Vikinol™ 18, ColaLube™ 3410, ColaLube™ 3407, and additives under the tradename ColaMid™. The one or more secondary friction-reducing components may be present in the friction reducing composition in an amount ≥about 5.0 wt %, e.g., ≥about 10.0 wt %, ≥about ≥about 20.0 wt %, ≥about 50.0 wt %, ≥about 70.0 wt %, or ≥about 90 wt %, based on the total weight of the friction-reducing composition. Additionally or alternatively, the one or more secondary friction-reducing components may be present in an amount ≤about 95 wt %, e.g., ≤about 75.0 wt %, ≤about 50.0 wt %, ≤about 25.0 wt %, ≤about 20.0 wt %, or ≤about 10.0 wt %, based on the total weight of the friction-reducing composition. Ranges of the amount of secondary friction-reducing component that are expressly disclosed herein include ranges formed by any combination of the above-recited individual values, e.g., about 5.0 to about 95.0 wt %, about 10.0 to about 90.0 wt %, about 15.0 to about 85.0 wt %, about 20.0 to about 80.0 wt %, about 25.0 to about 75.0 wt %, about 30.0 to about 70.0 wt %, about 35.0 to about 65.0 wt %, about 40.0 to about 60.0 wt %, about 45.0 to about 55.0 wt %, etc.

Alternatively, secondary friction-reducing components may be absent or substantially absent from the friction-reducing composition. For instance, the one or more secondary friction-reducing components may be present in an amount ≤about 10 wt %, or ≤about 5 wt %, or ≤about 1 wt %, or ≤about 0.5 wt %, ≤about 0.1 wt %, or about 0.0 wt %. Additionally or alternatively, each of the following secondary friction-reducing components may be absent or substantially absent from the friction-reducing composition: substituted imidazolines; substituted amides; hydrocarbyl diols; glycerol carbamates; hydrocarbyl thioglycerols; phosphates; and phosphites. For example, each of substituted imidazolines, substituted amides, hydrocarbyl diols, glycerol carbamates, hydrocarbyl thioglycerols, phosphates, and phosphites may be present in an amount ≤about 10 wt %, or ≤about 5 wt %, or ≤about 1 wt %, or ≤about 0.5 wt %, ≤about 0.1 wt %, or about 0.0 wt %. Additionally or alternatively, the combination of the following secondary friction-reducing components may be absent or substantially absent from the friction-reducing composition: substituted imidazolines; substituted amides; hydrocarbyl diols; glycerol carbamates; hydrocarbyl thioglycerols; phosphates; and phosphites. For example, the combination of substituted imidazolines, substituted amides, hydrocarbyl diols, glycerol carbamates, hydrocarbyl thioglycerols, phosphates, and phosphites may be present in an amount ≤about 10 wt %, or ≤about 5 wt %, or ≤about 1 wt %, or ≤about 0.5 wt %, ≤about 0.1 wt %, or about 0.0 wt %.

Oil-Based Mud Composition

Generally, the oil-based mud composition may include a base oil and one or more base oil additives. Preferably, the friction-reduction compositions described herein are absent or substantially absent from the oil-based mud composition. Although the mechanisms are not entirely understood, it is believed that such friction-reduction compositions included in an oil-based mud composition will be lost over time due to chemical degradation, chemical interaction with other additives, and/or adsorption on to rock and rock cuttings. It has been discovered that some such friction-reduction compositions present in an oil-based mud composition may even degrade or react to form moieties over a period which can result in an increase in the coefficient of friction over that of the oil-based mud composition absent the friction-reducing composition.

Base Oils

Numerous base oils are known in the art. Particular base oils that are useful in the present disclosure include natural oils and synthetic oils, as well as unconventional oils (or mixtures thereof), which can be used unrefined, refined, or re-refined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one base oil property. One skilled in the art is familiar with many purification processes. These processes include solvent extraction, secondary distillation, acid extraction, base extraction, filtration, and percolation. Re-refined oils are obtained by processes analogous to refined oils but using an oil that has been previously used as a feed stock.

Groups I, II, III, IV, and V are broad lube base oil stock categories developed and defined by the American Petroleum Institute (API Publication 1509; www.API.org) to create guidelines for base oils. Group I base stocks have a viscosity index of 80 to 120 and contain >0.03% sulfur and/or less than 90% saturates. Group II base stocks have a viscosity index of 80 to 120, and contain ≤0.03% sulfur and ≥90% saturates. Group III stocks have a viscosity index >120 and contain ≤0.03% sulfur and >90% saturates. Group IV includes polyalphaolefins (PAO) and Gas-to-Liquid (GTL) materials. Group V base stock includes base stocks not included in Groups I-IV. The table below summarizes properties of each of these five groups.

Exemplary Base Oil Properties

|  | Saturates (wt %) | Sulfur (wt %) | Viscosity Index (cSt) |
| --- | --- | --- | --- |
| Group I | <90 and/or | >0.03 and/or | 80 to 120 |
| Group II | ≥90 and | ≤0.03 and | 80 to 120 |
| Group III | ≥90 and | ≤0.03 and | ≥120 |
| Group IV | Includes PAO's and GTL's | | |
| Group V | All other base oil stocks not included in Groups I-IV | | |

Useful GTL's include those described as high purity hydrocarbon feedstocks at paragraphs [0245]-[0303] of US 2008/0045638. PAO's useful herein include those described in paragraphs [0243]-[0266] of US 2008/0045638. Useful Group III Base Oils include those described at paragraphs [0304]-[0306] of US 2008/0045638.

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted. Group II and/or Group III hydroprocessed or hydrocracked basestocks, including synthetic oils, are also well known basestock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$ to $C_{14}$ olefins, e.g., $C_8$, $C_{10}$, $C_{12}$, $C_{14}$ olefins or mixtures thereof, may be utilized. Some such PAO's are described in U.S. Pat. Nos. 4,956,122; 4,827,064; and 4,827,073, each of which is incorporated herein by reference in its entirety.

The number average molecular weights of the PAOs, which are known materials and generally available on a major commercial scale from suppliers such as ExxonMobil Chemical Company, Chevron Phillips Chemical Company, BP, and others, typically vary from 250 to 3,000 g/mol, although PAO's are typically made in Kinematic viscosities up to 3,500 cSt (100° C.). The PAOs are typically comprised of relatively low molecular weight hydrogenated polymers or oligomers of alphaolefins which include, but are not limited to, $C_2$ to $C_{32}$ alphaolefins with the $C_8$ to $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of $C_{14}$ to $C_{18}$ may be used to provide low viscosity basestocks of acceptably low volatility. Depending on the viscosity grade and the starting oligomer, the PAOs may be predominantly trimers and/or tetramers of the starting olefins, with minor amounts of the higher oligomers, having a Kinematic viscosity range of 1.5 to 3,500 cSt (Kv100), such as from 1.5 to 12 cSt.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters, such as ethyl acetate or ethyl propionate. For example the methods disclosed by U.S. Pat. No. 4,149,178 or 3,382,291 may be conveniently used herein. Other descriptions of PAO synthesis are found in the following: U.S. Pat. Nos. 3,742,082; 3,769,363; 3,876,720; 4,239,930; 4,367,352; 4,413,156; 4,434,408; 4,910,355; 4,956,122; and 5,068,487. The dimers of the $C_{14}$ to $C_{18}$ olefins are described in U.S. Pat. No. 4,218,330. The PAO's may be produced using a metallocene catalyst compound as described in U.S. Pat. Nos. 8,535,514 and 8,247,358. Other useful fluids for use as base oils include non-conventional or unconventional base stocks that have been processed, preferably catalytically, or synthesized to provide high performance characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of base oil viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials, such as, for example, by distillation and subsequently subjected to a final wax processing step, which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; and (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, preferably F-T material derived base stock(s) and/or base oil(s), are characterized typically as having Kinematic viscosities at 100° C. of from 2 cSt to 50 cSt (ASTM D445). They are further characterized typically as having pour points of –5° C. to –40° C. or lower (ASTM D97). They are also characterized typically as having viscosity indices of 80 to 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target Kinematic viscosity.

The GTL material, from which the GTL base stock(s) and/or base oil(s) is/are derived is preferably an F-T material (i.e., hydrocarbons, waxy hydrocarbons, wax). In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) and hydrodewaxed, or hydroisomerized/cat (and/or solvent) dewaxed base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

Base oils for use in the formulated oil-based mud compositions useful in the present disclosure are any of the variety of oils corresponding to API Group I, Group II, Group III, Group IV, and Group V oils, and mixtures thereof, preferably API Group II, Group III, Group IV, and Group V oils, and mixtures thereof, more preferably the Group III to Group V base oils due to their exceptional volatility, stability, viscometric, and cleanliness features. Minor quantities of Group I stock, such as the amount used to dilute additives for blending into formulated lube oil products, can be tolerated, but should be kept to a minimum, i.e., amounts only associated with their use as diluents/carrier oil for additives used on an "as-received" basis. Even in regard to the Group II stocks, it is preferred that the Group II stock be in the higher quality range associated with that stock, i.e., a Group II stock having a viscosity index in the range of 100 to 120.

Some base oils may have an ester content ≤about 50 wt %, e.g., ≤about 40 wt %, ≤about 30 wt %, ≤about 5.0 wt %, or ≤about 1.0 wt %. Additionally or alternatively, some base oils may have an ester content ≥about 40 wt %, e.g., ≥about 50 wt %, ≥about 70 wt %, or ≥about 90 wt %.

Some base oils may have an aromatic contents ≤about 15.0 wt %, e.g., ≤about 10.0 wt %, ≤about 5.0 wt %, ≤about 1.0 wt %, ≤about 0.50 wt %, ≤about 0.10 wt %, ≤about 0.05 wt %, ≤about 0.01 wt %, or ≤about 0.005 wt %. Additionally or alternatively, the aromatics content may be ≥about 0.005 wt %, e.g., ≥about 0.01 wt %, ≥about 0.05 wt %, ≥about 0.10 wt %, ≥about 0.5 wt %, ≥about 0.1 wt %, ≥about 1.0 wt %, ≥about 5.0 wt %, or ≥about 10.0 wt %. Ranges of the aromatics content expressly disclosed herein include all combinations of the above-enumerated values, e.g., about 0.005 to about 15.0 wt %, about 0.01 to about 10.0 wt %, about 0.05 to about 5.0 wt %, about 0.10 to about 1.0 wt %, etc.

Some exemplary base oils have been characterized by their Kinematic viscosity at 40° C. (Kv40). For example, particular base oils may have a viscosity ≥about 1.0 cSt, e.g., ≥about 1.3 cSt, ≥about 1.5 cSt, ≥about 1.7 cSt, ≥about 1.9 cSt, ≥about 2.1 cSt, ≥about 2.3 cSt, ≥about 2.5 cSt, ≥about 2.7 cSt, ≥about 2.9 cSt, ≥about 3.1 cSt, ≥about 3.3 cSt, ≥about 3.5 cSt, ≥about 3.7 cSt, ≥about 4.0 cSt, ≥about 4.5 cSt, or ≥about 4.8 cSt, at 40° C. Additionally or alternatively, the viscosity at 40° C. may be ≤about 5.0 cSt, e.g., ≤about 4.8 cSt, ≤about 4.5 cSt, ≤about 4.0 cSt, ≤about 3.7 cSt, ≤about 3.5 cSt, ≤about 3.3 cSt, ≤about 3.1 cSt, ≤about 2.9 cSt, ≤about 2.7 cSt, ≤about 2.5 cSt, ≤about 2.3 cSt, ≤about 2.1 cSt, ≤about 1.9 cSt, ≤about 1.7 cSt, ≤about 1.5 cSt, ≤about 1.3 cSt, or ≤about 1.1 cSt, at 40° C. Some such base oils are available from ExxonMobil Chemical Company under the tradename Escaid™, e.g., Escaid™ 110 comprises a desulfurized hydrogenated hydrocarbon containing less than 0.50 wt % aromatics and having a viscosity of about 1.7 cSt at 40° C., Escaid™ 115 having a viscosity of about 2.1 cSt at 40° C., Escaid™ 120 having a flash point above 100° C., and Escaid™ 120 ULA having an aromatics content <0.01 wt %.

Base Oil Additives

Often, the oil-based mud composition includes additional additives. Preferably, one or more of the additional additives form a heterogeneous blend with the base oil. In such aspects, the oil-based mud composition is preferably a heterogeneous blend having base oil as the continuous phase and one or more additional additives as the dispersed or internal phase. Alternatively or additionally, one or more of the additional additives can solubilize in the base oil.

For example, the oil-based mud composition can include additional additives including, but not limited to, an internal phase, which is typically water or a brine (i.e., the oil-based mud composition is an inverted emulsion), a pH buffer, a viscosifier and/or a rheology modifier, an emulsifier, a wetting agent, a weighting agent, a fluid loss additive, and a friction reducer. Preferably, the oil-based mud composition does not include additives, particularly viscosifiers and/or rheology modifiers that contain amides and/or amines.

For example, the oil-based mud composition may include a pH buffer selected from the group consisting of magnesium oxide, potassium hydroxide, calcium oxide, and calcium hydroxide. Commercially available examples of a pH buffer include lime. The pH buffer can be in a concentration in the range of about 0.5 to about 10.0 pounds per barrel (ppb) of the oil-based mud composition. Useful oil-based mud composition can have a pH ranging from a low of about 7, 8, 9, 10, 11, or 12 to a high of about 14, such as from 10 to 14.

The oil-based mud composition may optionally include a viscosifier and/or a rheology modifier. Suitable viscosifiers may be selected from the group consisting of inorganic viscosifier, fatty acids, including but not limited to dimer and trimer poly carboxylic fatty acids, diamines, polyamindes, organophilic clays, and combinations thereof. Commercially available examples of a suitable viscosifier include, but are not limited to, VG-PLUS™, available from M-I Swaco, a Schlumberger Company; RHEMOD L™, TAU-MOD™, RM-63™, and combinations thereof, marketed by Halliburton Energy Services, Inc. According to an embodiment, the viscosifier and/or rheology modifier is in a concentration of at least 0.5 ppb of the oil-based mud composition. The viscosifier and/or rheology modifier can also be in a concentration in the range of about 0.5 to about 20 ppb, alternatively of about 0.5 to about 10 ppb, of the oil-based mud composition.

The oil-based mud composition may further include a lubricant in addition to the friction-reducing composition described herein. In particular embodiments, the additional lubricant comprises a particulate material, e.g., graphite such as Steelseal™, available from Halliburton.

The oil-based mud composition can further include an emulsifier. The emulsifier can be selected from the group consisting of tall oil-based fatty acid derivatives such as amides, amines, amidoamines, and imidazolines made by reactions of fatty acids and various ethanolamine compounds, vegetable oil-based derivatives, and combinations thereof. Commercially available examples of a suitable emulsifier include, but are not limited to, EZ MUL™ NT, INVERMUL™ NT, LE SUPERMUL™, and combinations thereof, marketed by Halliburton Energy Services, Inc, MEGAMUL™, VersaMul™, VersaCoat™, marketed by MISwaco, a Schlumberger Company. According to an embodiment, the emulsifier is in at least a sufficient concentration such that the oil-based mud composition maintains a stable emulsion or invert emulsion. According to yet another embodiment, the emulsifier is in a concentration of at least 1 ppb of the oil-based mud composition. The emulsifier can also be in a concentration in the range of about 1 to about 20 ppb of the oil-based mud composition.

The oil-based mud composition can further include a weighting agent. The weighting agent can be selected from the group consisting of barite, hematite, manganese tetroxide, calcium carbonate, and combinations thereof. Commercially available examples of a suitable weighting agent include, but are not limited to, BAROID™, BARACARB™ BARODENSE™, and combinations thereof, marketed by Halliburton Energy Services, Inc and MICROMAX™, marketed by Elkem. According to an embodiment, the weighting agent is in a concentration of at least 10 ppb of the oil-based mud composition. The weighting agent can also be in a concentration in the range of about 10 to about 1000 ppb, such as 10-800 ppb, of the oil-based mud composition.

The oil-based mud composition can further include a fluid loss additive. The fluid loss additive can be selected from the group consisting of oleophilic polymers, including cross-linked oleophilic polymers, particulates. Commercially available examples of a suitable fluid loss additive include, but are not limited to VERSATROL™, available from M-I Swaco; N-DRIL™ HT PLUS, ADAPTA™, marketed by Halliburton Energy Services, Inc. The fluid loss additive can also be in a concentration in the range of about 0.5 to about 10 ppb of the oil-based mud composition.

The oil-based mud composition can further include an ester additive. The ester additive can be in a concentration in the range of about 1% to 20%.

The oil-based mud composition may also optionally include one or more metal salts, $MX_y$, where M is a Group 1 or Group 2 metal, X is a halogen, and y is 1 to 2. Exemplary such salts include, NaCl, KCl, $CaCl_2$, $MgCl_2$, etc. The total amount of such salts in the oil-based mud composition is typically about 10-35 wt % in the water phase. Organic additives that lower the water activity may also be used.

Water may also be present in the oil-based mud composition at any convenient concentration, typically at a relatively low concentration, e.g., ≤about 15.0 wt %, ≤about 12.5 wt %, ≤about 10.0 wt %, ≤about 7.5 wt %, ≤about 5.0 wt %, ≤about 2.5 wt %, or ≤about 1.0 wt %, the wt % being based on the total weight of the base oil and the water. Additionally or alternatively, the concentration of water may be ≥about 0.5 wt %, e.g., ≥about 1.0 wt %, ≥about 2.5 wt %, ≥about 5.0 wt %, ≥about 7.5 wt %, ≥about 10.0 wt %, ≥about 12.5 wt %, or ≥about 15.0 wt %. In particular embodiments, the amount of water may be about 1 to about 21 gallons per barrel of oil-based mud composition, such as about 1 to about 10 gallons per barrel of oil-based mud composition. Range of the water content that are expressly disclosed comprise ranges formed from any of the above-enumerated values, e.g., about 0.5 to about 20.0 wt %, about 0.5 to about 15.0 wt %, about 0.5 to about 12.5 wt %, about 0.5 to about 10.0 wt %, about 0.5 to about 7.5 wt %, about 0.5 to about 5.0 wt %, about 0.5 to about 2.5 wt %, about 0.5 to about 1.0 wt %, about 1.0 to about 10.0 wt %, about 1.0 to about 7.5 wt %, about 1.0 to about 5.0 wt %, about 1.0 to about 2.5 wt %, about 2.5 to about 10.0 wt %, about 2.5 to about 7.5 wt %, about 2.5 to about 5.0 wt %, about 5.0 to about 10.0 wt %, about 5.0 to about 7.5 wt %, etc.

The oil-based mud composition can further include wetting agents. The wetting agents can be selected from the group consisting of tall oil-based fatty acid derivatives such as amides, amines, amidoamines, and imidazolines made by reactions of fatty acids and various ethanolamine compounds, vegetable oil-based derivatives, and combinations thereof. Commercially available examples of suitable wetting agents include, but are not limited to, DrillTreat™, OMC™, marketed by Halliburton Energy Services, Inc., VersaWet™, marketed by MISwaco, a Schlumberger Company. According to an embodiment, the wetting agent is in at least a sufficient concentration such that the oil-based mud composition maintains a stable emulsion or invert emulsion. According to yet another embodiment, the wetting agent is in a concentration of at least 0.25 ppb of oil-based mud composition. The wetting agent can also be in a concentration in the range of about 0.05 to about 20 ppb, such as about 0.25 to about 20 ppb of the oil-based mud composition. In another embodiment, the wetting agent is absent from the oil-based mud composition.

Lubricant Compositions

The friction-reducing composition may be blended with the oil-based mud formulation to form a lubricant composition. Generally, the friction-reducing composition is at least partially dispersible in the oil-based mud composition at bulk conditions of drilling operations.

The oil-based mud composition is typically present in the lubricant composition in an amount of ≥about 50.0 wt %, ≥about 55.0 wt %, ≥about 60.0 wt %, ≥about 65.0 wt %, ≥about 70.0 wt %, ≥about 75.0 wt %, ≥about 80.0 wt %, ≥about 85.0 wt %, ≥about 90.0 wt %, ≥about 95.0 wt %, or ≥about 97.0 wt %, of the lubricant composition. Additionally or alternatively, the lubricant composition comprises ≤about 99.0 wt %, e.g., ≤about 97.0 wt %, ≤about 95.0 wt %, ≤about 90.0 wt %, ≤about 80.0 wt %, ≤about 75.0 wt %, ≤about 70.0 wt %, ≤about 65.0 wt %, ≤about 60.0 wt %, ≤or about 55.0 wt % oil-based mud composition. Ranges of the amount of oil-based mud composition in the lubricant composition include ranges formed from any combination of the above-enumerated values, e.g., about 50.0 to about 99.0 wt %, about 55.0 to about 97.0 wt %, about 60.0 to about 95.0 wt %, about 65.0 to about 90.0 wt %, about 70.0 to about 85.0 wt %, about 75.0 to about 80.0 wt %, about 70.0 to about 95.0 wt %, about 80.0 to about 95.0 wt %, etc.

Preferably, the base oil is present in the lubricant composition in ranges from about 50.0 to about 99.0 wt %, about 55.0 to about 97.0 wt %, about 60.0 to about 95.0 wt %, about 65.0 to about 90.0 wt %, about 70.0 to about 85.0 wt %, about 75.0 to about 80.0 wt %, about 70.0 to about 95.0 wt %, about 80.0 to about 95.0 wt %. The friction-reducing composition is typically present in the lubricant composition in an amount of ≥about 0.1 wt %, e.g., ≥about 0.5 wt %, ≥about 1.0 wt %, ≥about 5.0 wt %, ≥about 10.0 wt %, ≥about 15.0 wt %, or ≥about 19.0 wt %. Additionally or alternatively, the lubricant composition comprises ≤about 20.0 wt %, e.g., ≤about 19.0 wt %, ≤about 15.0 wt %, ≤about 10.0 wt %, ≤about 5.0 wt %, ≤about 1.0 wt %, or ≤about 0.1 wt % friction-reducing composition. Ranges of the amount of friction-reducing composition in the lubricant composition include ranges formed from any combination of the above-enumerated values, e.g., about 0.1 to about 20.0 wt %, about 1.0 to about 15.0 wt %, about 5.0 to about 10.0 wt %, etc. All weight percentages are based on the total weight of the oil-based mud composition and the friction-reducing composition.

Lubricant compositions generally have a coefficient of friction less than that of the oil-based mud composition. Some lubricant compositions have a coefficient of friction of ≤about 0.40, e.g., ≤about 0.30, ≤about 0.25, ≤about 0.20, ≤about 0.15, or ≤about 0.10, or ≤about 0.05. Additionally or alternatively, the coefficient of friction may be ≥about 0.01, e.g., ≥about 0.03, ≥about 0.05, ≥about 0.10, ≥about 0.20, or ≥about 0.25, or ≥about 0.30. Ranges of the coefficient of friction of the lubricant composition include ranges formed from any combination of the above-enumerated values, e.g., about 0.01 to about 0.40, about 0.05 to about 0.30, about 0.10 to about 0.25, about 0.15 to about 0.20, etc.

Additionally or alternatively, the lubricant composition may be characterized by a change in the coefficient of friction relative to the coefficient of friction of the oil-based mud composition without the friction-reducing composition. In other words, the lubricant composition having the friction reducing composition may have a coefficient of friction that is at least about 5.0% less than, e.g., is at least about 10.0% less than, is at least about 15.0% less than, is at least about 20.0% less than, is at least about 25.0% less than, is at least about 30.0% less than, is at least about 35.0% less than, is at least about 40.0% less than, is at least about 45.0% less than, is at least about 50.0% less than, is at least about 55.0% less than, is at least about 60.0% less than, the coefficient of friction of the oil-based mud composition in the absence of the additive composition. Ranges of the reduction in the coefficient of friction of the lubricant composition relative to the oil-based mud composition without the friction-reducing composition include ranges formed from any combination of the above-enumerated values, e.g., about 5.0 to about 60.0% lower, about 10.0 to about 50.0% lower, about 15.0 to about 40.0% lower, about 20.0 to about 35.0% lower, about 25.0 to about 30.0% lower, etc. For clarity, an exemplary lubricant composition may comprise 4.0 g of friction reducing agent and 96.0 g of an oil-based mud composition comprising 86.0 g of base oil and 10.0 g of other additives. The reduction in the coefficient of friction would be determined by comparing the coefficient of friction of this exemplary composition would be compared to the coefficient of friction of a composition comprising 86.0 g base oil and 10.0 g of the other additives.

Typically, the lubricant composition is free or substantially free of crosslinking agents and/or gelling agents, e.g., amines, and/or other compounds that would facilitate crosslinking and/or polymerization of the compound according to Formula 1 present in the friction-reducing composition. For example, preferably the lubricant composition comprises less than about 0.5 wt % of crosslinking and/or gelling agents based on the weight of the lubricant composition, more preferably less than about 0.1 wt %, such as about 0 wt %.

Drilling Operations

Friction-reducing compositions described herein are useful in any number of drilling operations. The friction-reducing compositions are particularly useful in drilling operations having operational and/or mechanical constraints. For example, drilling operations may be constrained due to torque limits at the drilling rig. These torque constraints may be due to maximum torque that a driver can deliver and/or the maximum torque that the drilling string can withstand before metal failure will occur; such constraints are therefore different for different drilling rigs due to either the size of the driver and/or the drill string in use. The Operating Torque can be measured by a dedicated device (e.g., a torque sub) and/or by measured power usage by the driver. Typically, drilling operations are conducted with at least a 10% safety margin between the Operating Torque and the torque limit. When the Operating Torque is nearing or exceeding what is considered to be a reasonable value, this will limit the length of the wellbore that is achievable. Operating changes can be performed to reduce the Operating Torque, e.g., reducing the rate of penetration (the forward rate of drilling), removing accumulated cuttings from the wellbore, removing the drill string from the wellbore and replacing/refurbishing worn components, and/or reducing the amount of low gravity solids (ground down cuttings) from the circulating oil-based mud composition. These steps to reduce the operating torque can be expensive and time consuming, and may offer little benefit. Therefore, in certain aspects the addition of the friction-reduction compositions described herein is beneficial to reduce the Operating Torque so as to increase rate of penetration and/or allow for greater length of the wellbore.

It has been discovered that the friction-reduction compositions described herein should generally only be introduced to a drilling operation when a reduction in friction is needed due to operating and/or mechanical limits, e.g., torque limits. Thus, preferred methods according to the subject matter of the disclosure comprise introducing an oil-based mud composition into the well, operating the drilling operation for a period of time with the base-oil composition, and subsequently introducing the friction-reducing composition into the well. In such aspects, typically a torque limit for the drilling operation is determined. Generally, the torque limit corresponds to the maximum torque that a driver can deliver and/or the maximum torque that the drilling string can withstand before metal failure will occur. Preferably, the friction-reducing composition is introduced into the well when the Operating Torque of the drilling operation is ≥about 90% of the torque limit, or ≥about 95% of the torque limit, or ≥about 99% of the torque limit.

Alternatively or additionally, in certain aspects it is desirable to use the friction-reduction compositions described herein to reduce Operating Torque. Preferably, the use is a targeted use of a friction-reducing composition comprising at least one compound represented by Formula I to reduce the Operating Torque of the drilling operation when the Operating Torque has reached a threshold level, e.g., ≥about 90% of the torque limit, or ≥about 95% of the torque limit, or ≥about 99% of the torque limit. Preferably, the use of the friction-reducing composition reduces the Operating Torque of the drilling operation by at least about 1%, more preferably by at least about 2%, more preferably by at least about 3%, more preferably by at least about 5%, and more preferably at least about 10%. That is, preferably the drilling operation has an Operating Torque <about 99%, more preferably <about 98%, more preferably <about 97%, more preferably <about 95%, and ideally <about 90% of the Operating Torque of the same drilling operation performed with an oil-based mud composition, but lacking the friction-reducing composition.

Typical methods of introducing friction-reducing compositions into a drilling operation comprise blending the friction-reducing composition comprising at least one compound represented by Formula I and at least one base oil composition to form a lubricant composition, and introducing the lubricant composition into the well. The steps of introducing can comprise pumping the lubricant composition into the well. The pumping may be done continuously, i.e., providing a constant flow of lubricant composition, periodically, or intermittently, i.e., alternating between periods of flow and no flow of lubricant composition. Particular methods further include continuously, periodically, or intermittently providing a second amount of friction-reducing composition to the lubricant composition already provided to the well. In some methods, the continuous provision of the friction-reducing composition provides an overall reduction in the amount of friction-reducing agent used during the drilling process. Alternatively, the continuous provision of the friction-reducing agent may allow smoother drilling operation of the drilling process. The well can be, without limitation, an oil, gas, or water production well, or an injection well. Methods may further include one or more steps of advancing a downhole tool in the well.

The introduced lubricant composition may be exposed to temperatures in the well ranging from a low of about 50° C., 60° C., 70° C., 80° C., 90° C., 100° C., or 125° C. to a high of about 170° C., and pressures ranging from ambient pressure to a high of about 100 bar (10,000 kPa), 200 bar (20,000 kPa), 300 bar (30,000 kPa), 400 bar (40,000 kPa), 500 bar (50,000 kPa), or 600 bar (60,000 kPa). The introduced lubricant composition may be utilized when system components have rotation speed of ≤about 1000 rpm, e.g., ≤about 800 rpm, ≤about 700 rpm, and ≥about 0 rpm, such as from 1 to 1000 rpm. The introduced lubricant composition may also be utilized with minimal rotation but instead longitudinal motion at a speed of ≤10,000 m/hr (meters per hour); ≤1,000 m/hr; ≤100; and/or ≤10 m/hr.

According to an embodiment, the well penetrates a reservoir or is located adjacent to a reservoir. The drilling operations can further include the step of removing at least a portion of the lubricant composition after the step of introducing. The drilling operations can include any number of additional optional steps. For example, some drilling operations include one or more of the following optional steps: mounting and cementing of well pipes in the first well; mounting of a blowout preventer or lubricator in the top of the well; drilling, at a distance from the well, a second well against a section of the first well to the effect that the second well gets into operational contact with the first well; mounting and cementing of well pipes in the second well; mounting of a blowout preventer or lubricator in the top of the second well; whereafter the drilling from one of the first or second well continues down into the reservoir and the other well which is not drilled to the reservoir is filled wholly or partially with a fluid and a drilling tool is placed in the other well and the other well is subsequently closed so that the other well can be accessed at a later point in time, and that the tool is left in the other well so that this tool can establish a connection to the one of the first or second wells into which the drilling continued.

Still other optional steps include one or more of the following: calculating a desired path for a well of interest relative to a reference well; measuring a position of the well of interest relative to the reference well at a location along a wellbore of the well; calculating an actual path of the well of interest based at least in part on the measured position of the well of interest relative to the at least one reference well; comparing the actual path of the at least one well of interest to the desired path of the well of interest; and adjusting a drilling system to modify the actual path of the well of interest based at least in part on a deviation between the actual path of the well of interest and the desired path of the well of interest.

EXPERIMENTAL

Viscosity Index is determined from the Kinematic viscosity according to ASTM D2270-10e1.

Kinematic Viscosity is determined according to ASTM D445.

Coefficient of Friction (CoF) was determined using a Falex Block-on-Ring machine. The block was made of SAE 01 tool steel and the ring was made of SAE 4620 carbon steel. The block had a length of 15.76 mm (0.620 in.) and a width of 6.35 mm (0.250 in.). The ring had an outer diameter of 35 mm (1.377 in.) and a width of 8.15 mm (0.321 in.). The block had a surface roughness, $R_a$, ranging from 0.10 µm to 0.20 µm. The ring had a surface roughness, $R_a$, ranging from 0.15 µm to 0.30 µm. A new block and ring pair was used for each test.

For each example friction-reducing composition, a mixture containing an oil-based mud composition and the friction-reducing composition was prepared. The mixture was then loaded into the testing cell of the Falex Block-on-Ring machine that was pre-loaded with a new pair of block and ring. The interface between the block and the ring was fully emerged in the oil-based mud composition.

Each test commenced with an initial running-in period with a ring rotation speed of 400 rpm, during which the load of the block applied to the ring was gradually increased from 0 to 5 lbf and then from 5 to 15 lbf while the system was warmed from ambient temperature to 75° C. A series of three ramping cycles were then performed consisting of a ramping-down step followed by a ramping-up step. During each ramping-down step, the ring rotation speed was decreased from 400 to 0 rpm at 1 rpm/s, and during each ramping-up step the ring rotation speed was increased from 0 rpm to 400 rpm at 1 rpm/s. During some of these transitions, the rotation of the ring was stopped for 2 minutes to allow system relaxation. The COF vs. rpm relationships obtained during the ramping-up steps were quantitatively similar to that obtained during the ramping-down steps. The COF vs. rpm relationships obtained during the three ramping-down steps were averaged to obtain the reported COF vs rpm relationship. In some instances, a given friction-reducing composition was tested multiple times, in which case the average value is reported. The testing protocol schematically shown in the FIGURE.

EXAMPLES

Amidation Procedure for Examples 15-18

Benzoyl chloride (1 equiv.) and pyridine (1 equiv.) were dissolved to make a 0.5 M solution in methylene chloride. Amine (1 equiv.) was slowly added such that the temperature of the reaction was kept below 30° C. and the mixture was stirred for 5 h. The reaction was quenched with 5% HCl for 30 min and extracted with methylene chloride. The organic portion was dried over $MgSO_4$, filtered, and concentrated.

Example 1

In Example 1, a mixture was produced comprising 200 ml of an oil-based mud composition available under the tradename Versaclean, available from M-I SWACO, a Schlumberger company, and 6 ml of a conventional friction reducing agent available under the tradename Ultralube II, available from Integrity Industries, Inc., Kingsville, Tex., USA. The mixture was prepared by adding 6 ml of Ultralube II into 200 ml of the oil-based mud composition at room temperature, after which the mixture was stirred using a Hamilton Beach 936-2 mixer at 10,000 rpm until well-mixed. As reported in Table 1, at 30 rpm the mixture exhibited a 5% reduction in COF compared with the oil-based mud composition.

Example 2

In Example 2, Example 1 was substantially repeated, except that the composition comprised about 200 ml of the oil-based mud composition of Example 1 and 5.55 g of 3-pentadecylphenol from Sigma Aldrich (Technical Grade, 90%). As reported in Table 1, at 30 rpm the mixture exhibited a 44% reduction in COF compared with the oil-based mud composition.

Example 3

In Example 3, Example 1 was substantially repeated, except that the composition comprised about 200 ml of the oil-based mud composition of Example 1 and 4.78 g of 4-dodecylphenol from Sigma Aldrich (Mixture of isomers). As reported in Table 1, at 30 rpm the mixture exhibited a 22% reduction in COF compared with the oil-based mud composition.

Example 4

In Example 4, Example 1 was substantially repeated, except that the composition comprised about 200 ml of the oil-based mud composition of Example 1 and 5.44 g of Cardolite NX-2023, a CNSL derived product rich in cardanol available from Cardolite Corporation. As reported in Table 1, at 30 rpm the mixture exhibited a 22% reduction in CoF compared with the oil-based mud composition.

Example 5

In Example 5, Example 1 was substantially repeated, except that the composition comprised about 200 ml of the oil-based mud composition of Example 1 and 5.44 g of Cardolite NX-2024, a CNSL derived product rich in cardanol available from Cardolite Corporation. As reported in Table 1, at 30 rpm the mixture exhibited a 23% reduction in CoF compared with the oil-based mud composition.

Example 6

In Example 6, Example 1 was substantially repeated, except that the composition comprised about 200 ml of the oil-based mud composition of Example 1 and 5.44 g of 1500-1, a CNSL derived product rich in cardanol available from Palmer International, Inc. As reported in Table 1, at 30 rpm the mixture exhibited a 38% reduction in CoF compared with the oil-based mud composition.

Example 7

In Example 7, Example 1 was substantially repeated, except that the composition comprised about 200 ml of the oil-based mud composition of Example 1 and 6.11 g RAC-951LV, a phenalkamine produced by aminating a CNSL derived cardanol rich stream, available from Palmer International, Inc. As reported in Table 1, at 30 rpm the mixture exhibited a 12% reduction in CoF compared with the oil-based mud composition.

Example 8

In Example 8, Example 1 was substantially repeated, except that the composition comprised about 200 ml of the oil-based mud composition of Example 1 and 7.61 g of an isomeric mixture of a Mannich base having the following structure:

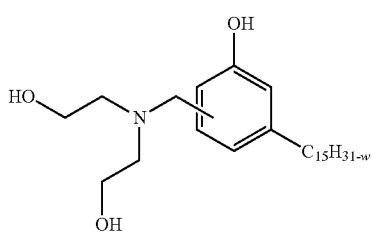

The Mannich base of the structure shown above was synthesized in accordance with the following procedure: A Mannich precursor, N-(2-hydroxyethyl-1,3-oxazolidine), was prepared as described in Russian Journal of Applied Chemistry, 85, 81-84 (2012). The oxazolidine (5.0 g, 42.7 mmol) and cardanol (13.3 mL, 42.7 mmol) were heated at 70° C. for 2.5 h. Upon cooling, the product was obtained as a viscous yellow liquid.

As reported in Table 1, at 30 rpm the mixture of the oil-based mud composition and the Mannich base exhibited a 12% reduction in CoF compared with the oil-based mud composition.

Example 9

In Example 9, Example 1 was substantially repeated, except that the composition comprised about 200 ml of the oil-based mud composition of Example 1 and 8.42 g of glycosyl-modified cardanol synthesized in accordance with the following procedure: Penta-acylated glucose (20 g, 51.3 mmol) and pentadecylphenol (15.6 g, 51.3 mmol) (Cardolite NX-2023) were dissolved in 100 mL of methylene chloride over 4 Å molecular sieves. Boron trifluoride etherate catalyst (6.3 mL, 51.3 mmol) was added and the reaction allowed to stir at ambient temperature for 24 h, then quenched with 5% sodium bicarbonate solution. The organic layer was dried (MgSO4), filtered, and concentrated.

As reported in Table 1, at 30 rpm the mixture of the oil-based mud composition and the glycosyl-modified cardanol exhibited a 14% reduction in CoF compared with the oil-based mud composition.

Example 10

In Example 10, Example 1 was substantially repeated, except that the composition comprised about 200 ml of the oil-based mud composition of Example 1 and 6.25 g of Cardelox 1, an ethoxylated cadanol with 1 mole of ethylene oxide per mole of cardanol, available from K2P Chemicals. As reported in Table 1, at 30 rpm the mixture exhibited a −13% reduction in CoF compared with the oil-based mud composition.

Example 11

In Example 11, Example 1 was substantially repeated, except that the composition comprised about 200 ml of the oil-based mud composition of Example 1 and 10.29 g Cardelox 6, an ethoxylated cadanol with 6 moles of ethylene oxide per mole of cardanol, available from K2P Chemicals. As reported in Table 1, at 30 rpm the mixture exhibited a −5% reduction in CoF compared with the oil-based mud composition.

Example 12

In Example 12, Example 1 was substantially repeated, except that the composition comprised about 200 ml of the oil-based mud composition of Example 1 and 6.38 g C14 LAO alkylated naphthol synthesized in accordance with the following procedure: A round bottom flask under N2 atmosphere was charged with 2-naphthol (101.78 g, 0.71 mol), Amberlyst™ 15H (2.34 g, 0.94 wt. %), and 1-tetradecene (145.58 g, 0.75 mol), an LAO. This mixture was heated with stirring at 120° C. for three days. The mixture was then cooled to 100° C., treated with activated charcoal (5.0 g), stirred for 30 minutes, and filtered through a pad of Celite™ diatomite to remove catalyst and charcoal. The filtrate was subjected to oil pump vacuum distillation up to 200° C. to remove unreacted 2-naphthol and unreacted tetradecene. The distillation pot bottoms were collected to yield a red-brown, viscous liquid. Analysis by gas chromatography indicated that the product was primarily monoalkyated, with a monoalkylate:dialkylate ratio of approximately 75/25.

As reported in Table 1, at 30 rpm the mixture of the oil-based mud composition and the alkylated naphthol exhibited a 12% reduction in CoF compared with the oil-based mud composition.

Example 13

In Example 13, Example 1 was substantially repeated, except that the composition comprised about 200 ml of the oil-based mud composition of Example 1 and 6.06 g C16 LAO alkylated anisole synthesized in accordance with the following procedure: A round bottom flask equipped with an addition funnel was charged with anisole (108.15 g, 1.00 mol) and a USY zeolite catalyst (5.01 g, 1.5 wt. %) under N2 atmosphere. The mixture was heated with stirring to 165° C. 1-hexadecene (230.03 g, 1.02 mol), an LAO, was added dropwise to the mixture over a period of one hour and the reaction continued for an additional one hour. The mixture was cooled to 100° C. and filtered through a pad of Celite™ diatomite to remove catalyst. The filtrate was subjected to oil pump vacuum distillation up to 190° C. to remove unreacted anisole and unreacted 1-hexadecene. The distillation pot bottoms were collected to yield the product as a light yellow, viscous liquid in 274.76 g yield. Analysis by gas chromatography indicated that the product was primarily monoalkylated, with a monoalkylate:dialkylate ratio of approximately 93/7.

As reported in Table 1, at 30 rpm the mixture of the oil-based mud composition and the LAO alkylated anisole exhibited a 5% reduction in CoF compared with the oil-based mud composition.

Example 14

In Example 14, Example 1 was substantially repeated, except that the composition comprised about 200 ml of the oil-based mud composition of Example 1 and 7.08 g C20 uPAO alkylated anisole synthesized in accordance with the following procedure: A round bottom flask equipped with an addition funnel was charged with anisole (800 g, 1.40 mol) and MCM-49 zeolite catalyst (44.0 g, 1.62 wt %) under N2 atmosphere. The mixture was heated with stirring to 150° C. The C20 uPAO olefin (1875 g, 6.68 mol) was added dropwise over a period of one hour and the reaction continued for an additional two hours. The reaction mixture was filtered through a pad of Celite™ diatomite to remove catalyst. The filtrate was subjected to oil pump vacuum distillation up to 200° C. to remove unreacted anisole and unreacted olefin. The distillation pot bottoms were collected to yield the product as a light yellow, viscous liquid in 1731 g yield. Analysis by gas chromatography indicated that the product was primarily monoalkylated, with a monoalkylate:dialkylate ratio of approximately 95/5.

As reported in Table 1, at 30 rpm the mixture of the oil-based mud composition and the uPAO alkylated anisole exhibited a −5% reduction in CoF compared with the oil-based mud composition.

Example 15

In Example 15, Example 1 was substantially repeated, except that the composition comprised about 200 ml of the oil-based mud composition of Example 1 and 7.55 g of 3-nitro-N-octadecylbenzamide. As reported in Table 1, at 30 rpm the mixture exhibited a 15% reduction in CoF compared with the oil-based mud composition.

Example 16

In Example 16, Example 1 was substantially repeated, except that the composition comprised about 200 ml of the oil-based mud composition of Example 1 and 4.26 g of 4-nitro-N-octadecylbenzamide. As reported in Table 1, at 30 rpm the mixture exhibited a 5% reduction in CoF compared with the oil-based mud composition.

Example 17

In Example 17, Example 1 was substantially repeated, except that the composition comprised about 200 ml of the oil-based mud composition of Example 1 and 7.58 g of 4-nitro-N-octadecylbenzamide synthesized using 18.5 g (100 mmol) of 4-nitrobenzoyl, 8 mL of pyridine, and 26.8 g (100 mmol) of oleylamine. As reported in Table 1, at 30 rpm the mixture exhibited a 6% reduction in CoF compared with the oil-based mud composition.

Example 18

In Example 18, Example 1 was substantially repeated, except that the composition comprised about 200 ml of the oil-based mud composition of Example 1 and 6.5 g of (Z)-4-nitro-N-(octadec-9-en-1-yl)benzamide synthesized using 18.5 g (100 mmol) of 4-nitrobenzoyl, 8 mL of pyridine, and 26.7 g (100 mmol) of oleylamine. As reported in Table 1, at 30 rpm the mixture exhibited a 6% reduction in CoF compared with the oil-based mud composition.

Example 19

In Example 19, Example 1 was substantially repeated, except that the composition comprised about 200 ml of the oil-based mud composition of Example 1 and 5.37 g BNX™ 565, phenol,4-[[4,6-bis(octylthio)-1,3,5-triazin-2-yl]amino]-2,6-bis(1,1-dimethylethyl)-, from Mayzo, Inc. As reported in Table 1, at 30 rpm the mixture exhibited a −6% reduction in CoF compared with the oil-based mud composition.

Example 20

In Example 20, Example 1 was substantially repeated, except that the composition comprised about 200 ml of the oil-based mud composition of Example 1 and 4.89 g BNX™ 1037, phenol, 2,4-bis[(dodecyltho)methyl]-6-methy-, from Mayzo, Inc. As reported in Table 1, at 30 rpm the mixture exhibited a 24% reduction in CoF compared with the oil-based mud composition.

TABLE 1

|   | Ex. 1 | Ex 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| [1]Relative CoF | 0.95 | 0.56 | 0.78 | 0.78 | 0.77 | 0.62 | 0.88 | 0.88 | 0.86 | 1.13 | 1.05 |
| [2]% Reduction | 5 | 44 | 22 | 22 | 23 | 38 | 12 | 12 | 14 | −13 | −5 |

|   | Ex. 12 | Ex. 13 | Ex.14 | Ex. 15 | Ex. 16 | Ex. 17 | Ex. 18 | Ex. 19 | Ex. 20 |
|---|---|---|---|---|---|---|---|---|---|
| [1]Relative CoF | 0.88 | 0.95 | 1.05 | 0.85 | 0.95 | 0.94 | 0.94 | 1.06 | 0.76 |
| [2]% Reduction | 12 | 5 | −5 | 15 | 5 | 6 | 6 | −6 | 24 |

[1]Relative CoF is as compared to the oil-based mud composition.
[2]% Reduction CoF = 1 − Relative CoF.

Examples 21-23

In Examples 21-23, the aging behavior of a laboratory scale oil-based mud composition and blends formed from the friction-reducing compositions of Examples 2 and 6 with the oil-based mud composition were studied. Each of Examples 21-23 were formulated with 200 ml of the oil-based mud composition. The oil-based mud composition comprised a sample of mud available under the tradename Megadril, available from M-I SWACO, a Schlumberger company. The sample had been in commercial use for an extended period of time so the exact composition was indeterminable. Also contained within the mud would be rock cuttings, formation oil, and accumulated degradation products.

Blends of the oil-based mud composition with a friction-reducing composition were produced in Examples 22-23 in accordance with the procedures of Example 1. The identity and amount of the friction-reducing composition used for each of Examples 22-23 is depicted in Table 2.

TABLE 2

| Example | Friction-Reducing Composition | Friction-Reducing Composition Amount |
|---|---|---|
| Ex. 22 | 3-pentadecylphenol (Sigma-Aldrich) | 5.55 g |
| Ex. 23 | 1500-1 (Palmer) | 5.44 g |

An initial COF for each Examples 21-23 was first measured. Examples 21-23 were then thermally aged at 75° C. for seven days in sealed capsules with constant agitation, after which the COF for each example was measured again. The initial COF values and those of the thermally aged example materials are reported in Table 3.

TABLE 3

| Example | Initial COF | COF Post Thermal Aging | COF Increase (%) |
|---|---|---|---|
| Ex. 21 | 0.230 | 0.252 | 9.6 |
| Ex. 22 | 0.129 | 0.273 | 112 |
| Ex. 23 | 0.144 | 0.285 | 98 |

As can be seen from Table 3, Examples 22 and 23, both comprising friction-reducing compositions of the type described as useful herein, exhibited a significantly larger increase in COF after thermal aging in comparison to Example 21 (the oil-based mud composition). These results were specific to this particular sample of a used field mud; similar deterioration may or may not occur with other used filed muds depending on exact composition, but these data suggest that the friction-reducing compositions of the disclosure degrade or react to form moieties over a period of time which results in an increase in the coefficient of friction over that of the oil-based mud composition absent the friction-reducing composition.

As demonstrated above, embodiments of the invention provide new friction-reducing compositions that may be useful in a variety of lubricating operations, e.g., wellbore extension, well completion, etc. The new friction-reducing compositions may have one or more of the following advantages. For example, the compositions may have a lower coefficient of friction than currently known compositions, thereby facilitating wellbore lengths not before achievable. Some compositions described herein may allow a drilling operation to operate at a lower torque and/or overall friction factor (also referred to as total friction factor). The total friction factor for a given drilling operation is a composite factor that combines the multiple factors specific to each well, drilling operation, and point in time for each well as it is evolving as the wellbore changes. Total friction factor is described in "Friction Factor Model and Interpretation of Real Time Data (Thesis)," Christine Frafjord, Petroleum Geoscience and Engineering, Department of Petroleum Engineering and Applied Geophysics, Norwegian Univ. of Sci. and Tech., May 2013; "Improvement of Torque-and-Drag Modeling in Long-Reach Wells," Seyed Ahmad Mirhaj, Eirik Kaarstad, Bernt S. Aadnoy, Modern Applied Sci., October 2011, Vol. 5, No. 5; 10 ISSN 1913-1844 E-ISSN 1913-1852; "Real Time Torque and Drag Analysis during Directional Drilling (Thesis)," Mohammad Fazaelizadeh, Univ. of Calgary, Dept. of Chemical and Petroleum Engineering, Calgary, Alberta, Calif., March, 2013, each of which is incorporated by reference herein in its entirety. Operating Torque and Total Friction Factor are each a measure of the stress of the operation on the equipment. Reductions in one or more of these values may enable longer improvements in any property adversely affected by higher values, e.g., longer wellbores, longer operating times, between maintenance periods, higher efficiency, etc. Other characteristics and additional advantages are apparent to those skilled in the art.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. For example, the compositions described herein may be free of any component, or composition not expressly recited or disclosed herein. Any method may lack any step not recited or disclosed herein. Likewise, the term "comprising" is considered synonymous with the term "including." And whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method comprising the steps of:
   a) providing at least one oil-based mud composition to a drilling operation;
   b) operating the drilling operation for a period of time with the oil-based mud composition; and
   c) adding a friction-reducing composition to the drilling operation, the friction-reducing composition comprising one or more compounds represented by Formula I:

$X_m$—Ar—$R_n$   Formula I, wherein Ar is a single or multi-ring aromatic moiety, each X group is a polar functional group, each R group is independently selected from a branched or unbranched, saturated or unsaturated, substituted or unsubstituted $C_1$ to $C_{50}$ hydrocarbyl group, wherein n is an integer greater than or equal to 1, and wherein m is an integer greater than or equal to 0 if at least one R group is substituted with a functional group and/or Ar contains a heteroatom, and otherwise is an integer greater than or equal to 1;
   wherein the one or more compounds represented by Formula I do not comprise an epoxide group; and
   wherein Ar is selected from the group consisting of an aryl group, a heteroaryl group, a biphenyl group, deprotonated cyclic $C_5$ diolefins, a polynuclear aromatic group, and combinations thereof and/or wherein each X group is independently selected from the group consisting of —$NH_2$, —$NO_2$, —CHO, —$CH_3$OH —$SO_2R$, —$SO_3H$, polyamines, polyols, oxazolidines, Group 1-2 metals, $NR_4^+$ groups, $PR_4^+$ groups, a glycosyl group, and combinations thereof.

2. The method of claim 1, wherein the friction-reducing composition is at least partially dispersible in the oil-based mud composition at bulk conditions of the drilling operation.

3. The method of claim 1, wherein the friction-reducing composition is in the liquid state at bulk conditions of the drilling operation.

4. The method of claim 1, wherein the step of providing the at least one oil-based mud composition comprises introducing the at least one oil-based mud composition into a wellbore, and wherein the step of adding a friction-reducing composition comprises introducing the friction-reducing composition into the wellbore.

5. The method of claim 1, wherein the step of adding the friction-reducing composition further comprises the steps of blending the friction-reducing composition with the oil-based mud composition to form a lubricant composition and providing the lubricant composition to the drilling operation, optionally wherein the friction-reducing composition is blended with the oil-based mud composition at a rate sufficient to provide a concentration of the friction-reducing composition in the lubricant composition of about 0.1 wt % to about 20 wt % based on the weight of the lubricant composition.

6. The method of claim 1, wherein the step of adding the friction-reducing composition comprises adding the friction-reducing-composition intermittently to maintain a desired Operating Torque.

7. The method of claim 1, further comprising the step of determining a torque limit for the drilling operation, and wherein the step of adding the friction-reducing composition to the drilling operation is conducted when the Operating Torque of the drilling operation is ≥about 90% of the torque limit.

8. The method of claim 1, wherein the drilling operation has an Operating Torque <95% of the Operating Torque of the same drilling operation performed with the oil-based mud composition, but lacking the friction-reducing composition.

9. The method of claim 1, wherein at least one R group contains a backbone comprising at least ten carbon atoms and/or wherein at least one R group contains a quaternary carbon atom directly bonded to Ar.

10. The method of claim 1, wherein at least one of m or n is greater than or equal to 2.

11. The method of claim 1, wherein the friction-reducing composition comprises one or more compounds represented by at least one of the Formulas Ia, Ib, or Ic:

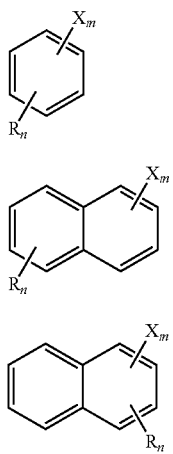

wherein R, X, m, and n are each as they are defined in claim 1.

12. The method of claim 11, wherein the friction-reducing composition comprises one or more compounds represented by at least one of the Formulas Ia or Ic, and wherein at least one R group is located meta- or para- from an X group.

13. The method of claim 11, wherein the one or more compounds represented by at least one of the Formulas Ia, Ib, or Ic is selected from the group consisting of alkylphenols, alkyl anisoles, alkyl naphthols, components of cashew nut shell liquid (CNSL), thioalkylphenols, alkyl benzamides, alkyl anilines, derivatives of any of the foregoing, and mixtures of any of the foregoing.

14. The method of claim 13, wherein the one or more compounds represented by at least one of the Formulas Ia, Ib, or Ic comprises a functionalized aromatic alkylated with a linear alpha olefin and/or a polyalphaolefin.

15. The method of claim 13, wherein the one or more compounds represented by at least one of the Formulas Ia, Ib, or Ic comprises an alkylphenol and/or an alkylphenol derivative.

16. The method of claim 15, wherein the one or more compounds represented by at least one of the Formulas Ia, Ib, or Ic comprises cardanol.

17. The method of claim 15, wherein the alkylphenol derivative is selected from the group consisting of phenalkamines, polyols, Mannich base polyol precursors, glycosyl-modified cardanol, and combinations or mixtures thereof.

18. The method of claim 1, wherein the drilling operation comprises one or more of: introducing a drill string; introducing coiled tubing; introducing casing; introducing screens; introducing tools for cleaning, fracturing, and perforating; rotating drill string; advancing the wellbore; withdrawing a drill string; and/or withdrawing coiled tubing.

19. The method of claim 1, wherein at least one R group contains a backbone comprising at least sixteen carbon atoms.

20. The method of claim 1, wherein at least one R group contains a quaternary carbon atom directly bonded to Ar.

21. The method of claim 1, wherein at least one R group contains a quaternary carbon atom directly bonded to Ar.

* * * * *